Figure 10:
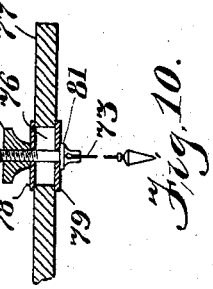

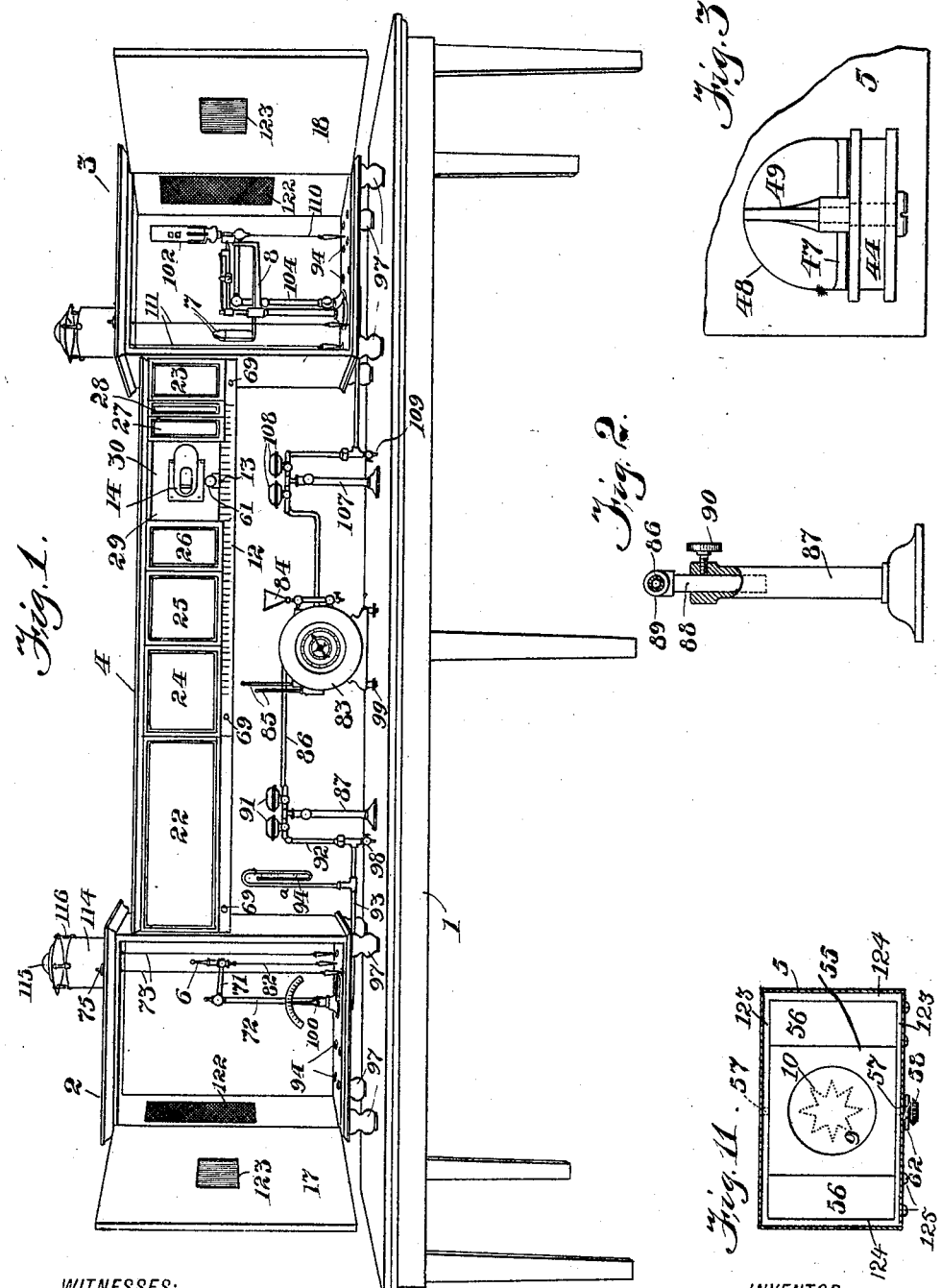

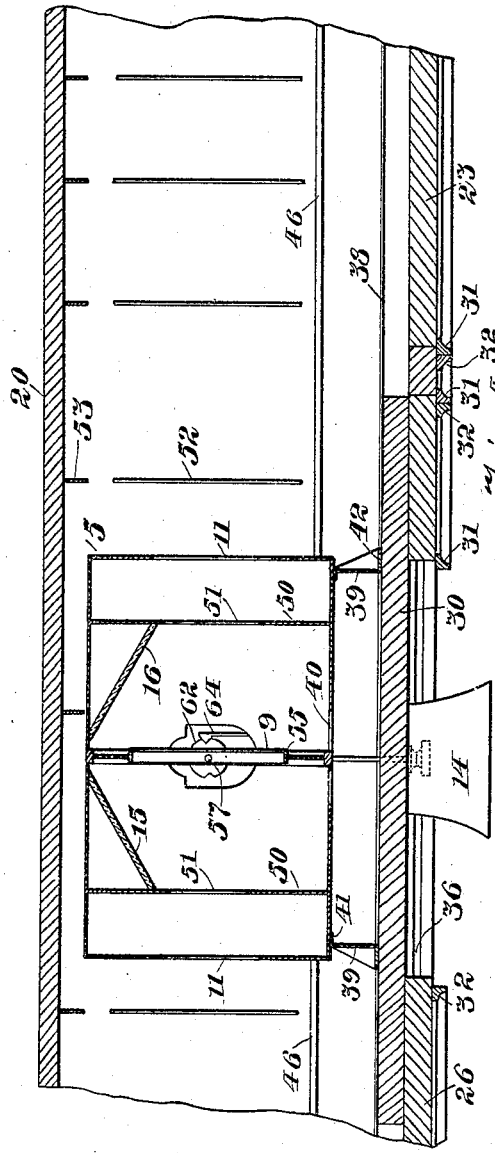
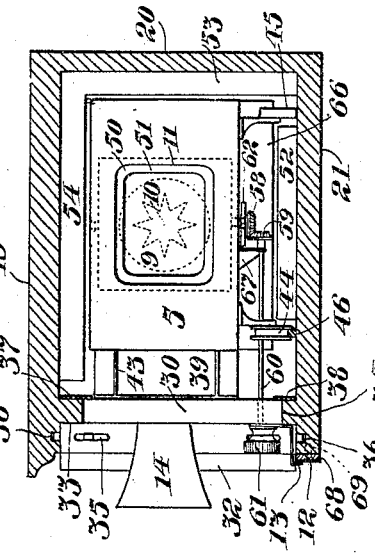
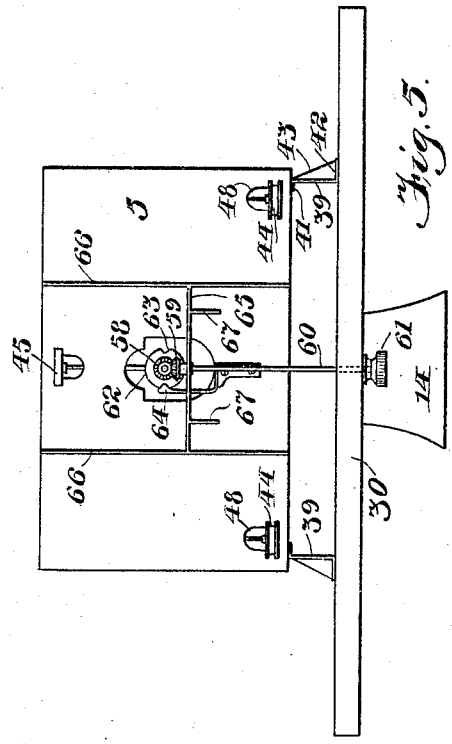

No. 773,144. PATENTED OCT. 25, 1904.
W. HINMAN.
PHOTOMETER.
APPLICATION FILED JULY 26, 1904.
NO MODEL. 3 SHEETS—SHEET 3.

WITNESSES:
Robert Head
Wm. M. MacLeard

INVENTOR
Walter Hinman
BY
 Stickney
ATTORNEY

No. 773,144. Patented October 25, 1904.

UNITED STATES PATENT OFFICE.

WALTER HINMAN, OF NEW YORK, N. Y.

PHOTOMETER.

SPECIFICATION forming part of Letters Patent No. 773,144, dated October 25, 1904.

Application filed July 26, 1904. Serial No. 218,259. (No model.)

*To all whom it may concern:*

Be it known that I, WALTER HINMAN, a citizen of the United States, residing in New York, in the county of New York and State of New York, have invented certain new and useful Improvements in Photometers, of which the following is a specification.

This invention relates to photometers, and particularly to those employed in measuring the power of gas-light.

In the class of photometers to which my invention appertains it is the practice to set a paper or other disk between two lights, whereof one is a standard light and the other is the light whose power is to be measured. These lights are set from sixty to one hundred inches apart and shine upon opposite sides of the disk. The latter has a translucent portion and may be viewed simultaneously from both sides by means of angular mirrors, whereby it may be determined whether the light shining upon one side is stronger than the light shining upon the opposite side. By adjusting the disk to and fro between the lights it may be brought to a position where the light shines equally upon both sides, and by noting the position occupied by the screen relatively to the lights the strength of the tested light may be determined by the application of the rule that the power of light varies inversely as the square of the distance from its source. When the light is stronger upon one side of the disk than the other, the translucent portion of the disk may be discerned, and when by adjustment of the disk the operator brings it to a point where he can no longer detect the translucent portion he knows that the light is equal upon the sides of the disk. Generally the testing takes place in a dark room, so as to avoid interference from outside light.

One of the principal objects of my invention is to make it practicable in every way to conduct the test in a light room, which is a great convenience.

Other objects are to enable the tests to be made more rapidly and with greater ease, to simplify the construction of the apparatus in several ways, and particularly with a view to rendering it convenient to ship, set up, and take down the apparatus, to improve the construction of the sighting-box containing the translucent disk, and to render it practicable in a closed photometer to test the strength of gas-light by comparing it with either candle-light or the light of a gas-burning standard lamp and also to standardize such standard lamp by means of candle-light.

Other objects and advantages will hereinafter appear.

Figure 7:
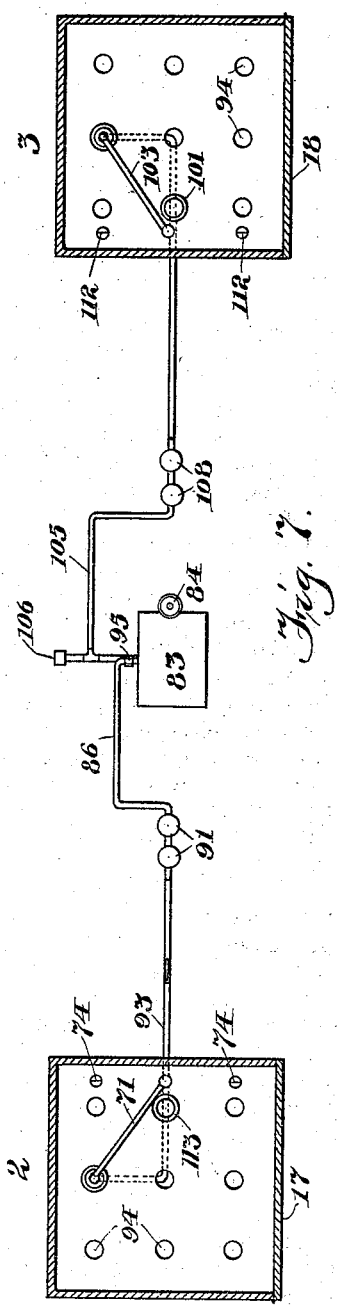
Figure 9:
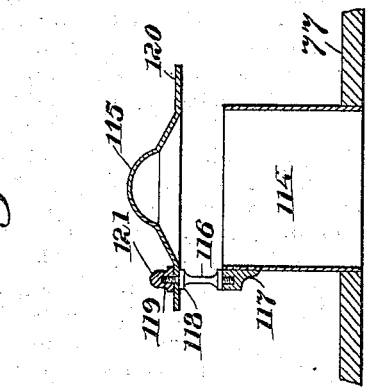
Figure 8:
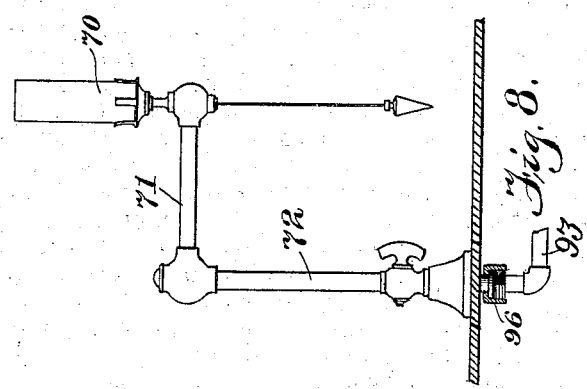

In the accompanying drawings, Figure 1 is a perspective view of an instrument or apparatus made in accordance with my invention. Fig. 2 is an elevation of a vertically-adjustable standard used in supporting the gas-piping above the table seen in Fig. 1. Fig. 3 is a bottom view of a guiding-wheel, bracket therefor, and the bottom of the sighting-box, one corner of the latter being shown. Fig. 4 is a horizontal section taken through the sighting-box and a portion of a gallery along which it travels. Fig. 5 is a bottom view, and Fig. 6 a vertical section from front to rear, of the sighting-box. Fig. 7 is a sectional plan showing the lower portions of two light-boxes and a plan of the piping. Fig. 8 is an elevation of a swing-arm pillar and its connection to the piping. Fig. 9 is a sectional elevation of a ventilator such as are placed on the tops of the light-boxes. Fig. 10 is a sectional detail of means for adjusting a plumb-bob or plummet along the top of a light-box. Fig. 11 shows the disk-holder pivoted in the sighting-box.

In the several views like parts are identified by like signs.

The apparatus, which rests upon a table 1, comprises light-boxes 2 and 3, a gallery 4, connecting said boxes, and a sighting-box 5, adjustable along said gallery. The light to be measured is emitted by a burner 6 in box 2, while in the other light-box are seen testing-candles 7, mounted upon the usual candle-balance 8. These lights shine respectively through the open ends of the gallery and upon opposite sides of a disk 9, mounted vertically in the sighting-box 5 and having the usual translucent spot or star 10, the sighting-box having openings 11 in its sides to admit the light. Along the lower edge of the gallery extends a scale 12, to which is adapted an index 13, provided upon the sighting-box. The divisions upon this scale are made with reference to the respective positions of the testing-burner 6 and standard lights 7, so that when the sighting-box is adjusted to a point where the lights shine with equal power upon the opposite sides of the disk 9 the number upon the scale, which is indicated by the index, gives the candle-power of the light emitted from the testing-burner 6, this being, however, subject to the usual corrections for temperature of gas, power of the standard light, &c. The opposite sides of the disk are viewed simultaneously through a hood or eyepiece 14 by means of angularly-set opposite mirrors 15 16, one at each side and in rear of the disk 9.

To the end that tests may be made or readings taken in a moderately-lighted room without liability of error, light is excluded from the apparatus, the boxes being provided with doors 17 18, which when closed keep out the light, and the gallery also being light-proof. One of the important features of the invention resides in provision of means whereby the sighting-box may have ample range of adjustment along the gallery, while exterior light is always excluded from the latter. The top 19, rear wall 20, and bottom 21 of the gallery are solid. The front wall comprises fixed panels 22 and 23 at the left-hand and right-hand ends, respectively, and a set of movable panels 24, 25, 26, 27, and 28, which, it will be noted, are of assorted sizes. These movable panels may be taken out and interchanged, so as to bring the sight-box opening 29 at any desired point along the gallery. Hence the sight-box may be adjusted for about half or more of the length of the gallery. Upon its front the sight-box is provided with a long shield 30, which carries the hood 14 and which extends at each side behind the paneling, thus permitting an extensive range of adjustment of the sight-box without disturbing the arrangement of the panels.

Upon the face of each of the fixed and movable panels is a molding extending along the top, bottom, and sides thereof. The left-hand molding or strip 31 upon each panel overlaps the edge of the latter, so as to overlie the adjoining molding, and thereby prevent the admission of light between the panels, the right-hand molding 32 of each panel being set in or away from the edge of the latter a distance agreeing with the overlap of the adjoining molding 31, so that the latter sets into a recess formed by said molding 32. The movable panels fit in between the top 19 and bottom 21 of the gallery and rest against top and bottom ledges 33 34 and are detachably held in place by vertically-sliding bolts 35 of ordinary construction, which shoot into grooves 36 36 in the top and bottom of the gallery. These top and bottom bolts may be provided upon each side edge of each panel, although for the narrowest panels only two bolts each are necessary. In order to change the panels, it is only necessary to withdraw the bolts, and when the panels are replaced the bolts may be again shot into the grooves.

The shield 30, whose function is to exclude light from the box 5, slides between the ledges 33 34, the latter being lined with top and bottom metal strips 37 38, projecting, respectively, below and above the top and bottom of the shield to exclude light. The lighting-box 5 is made of thin sheet metal, which conduces to both strength and lightness, the latter being a desirable quality, as it facilitates quick adjustment during the sighting operation. A further advantage arising from constructing the box of thin sheet metal is that it presents extremely thin exposed edges at its light-openings, so that reflection of light from such exposed edges is practically eliminated, this being an advantage of great importance. Owing to the thinness of its walls and the relatively large size of the sighting-box it is found desirable to brace the walls in several ways to prevent springing, which would be apt to lead to errors in the readings. The box is connected to said shield 30 by means of two vertical strips 39, which serve also as shields or screens to prevent light from reflecting from the walls of the gallery into the opening or openings 40 in the front of the box, through which observations are made. These strips or plates 39 are of sheet metal, and each along its vertical edge is bent in to form a flange 41 for attachment to the front wall of the box and along its opposite edge is bent outwardly to form a flange 42 for attachment to the shield 30, two or more webs or braces 43 being provided between the plate and flange 42. This forms a very light, inexpensive, and light-excluding connection between the light-box and the shield, besides stiffening the box itself.

The box runs freely upon a pair of guide-rolls 44 and a rear roll 45, the latter running upon the bottom of the gallery and the former fitting upon a track 46, rectangular in cross-section and secured upon the gallery-bottom. It will be understood that the shield 30 runs freely between the ledges 33 and 34, so that a mere touch is sufficient to roll the box and shield along. Each of the rolls is journaled upon a depending plate 47, Fig. 3, bent horizontally to form an ear or plate 48, which is attached to the under side of the sight-box, a web 49 extending between said plates to stiffen them. The plate 48 is of relatively large area, so as to give ample bearing area for the thin bottom of the box and avoid liability of springing thereof, while the wheel-brackets are very light and inexpensive.

Between the disk 9 and the ends or sides of the box are provided vertical screens 50, having light-openings 51, smaller than the openings 11, whereby undesirable reflection of light within the box is avoided, said screens 50, moreover, serving to stiffen the box, as they are formed of sheet metal. The mirrors 15 16 are disposed between the screens 50 and the disk. Reflection of light from the walls of the gallery is obviated by means of low screens 52, rising from the floor thereof at intervals, gradually increasing from the ends to the middle of the gallery, and like screens 53 54, projecting slightly from the rear and top of the gallery.

The disk 9 is fixed in a frame 55, which occupies a position in the middle of the box between front and rear screens 56 and is vertically pivoted at 57, so that it may be rotated to present each side of the screen alternately to the standard light and the tested light to guard against error. At its lower end the bottom pintle 57 of the disk-frame is provided with a bevel-gear 58, meshing with a similar gear 59, fixed upon the rear end of a horizontal shaft 60, which is provided at its front end with a finger wheel or lever 61, whereby the disk-frame may be rotated. Said pintle is also provided with a wheel 62, having two opposite notches 63, engageable in alternation by a spring-detent 64, secured by screws upon the bottom of the box. At its forward end the shaft 60 is journaled in the lower portion of the shield 30, and at its rear end it is journaled in a cross-rib 65, which unites a pair of pendent stiffening-ribs 66 and itself is provided with a pair of braces or webs 67. By supporting the shaft in this way near the point of meshing of the gears all liability of the latter springing apart is obviated, and, moreover, the bottom of the box is materially stiffened without adding unduly to its weight.

The scale 12 is made of celluloid and glued to a bar of wood 68, which is held upon the front edge of the gallery by screws 69.

In the left-hand light-box 2 the testing-burner 6 (for which may be substituted an Argand burner 70, as at Fig. 8) is mounted upon a swing-arm 71, carried by a pillar 72, standing upon the box-floor in the rear of the box, the swing-arm permitting the burner to be swung to a position of disuse, if desired, and also enabling the burner to be adjusted with precision to the proper distance from the burner in the other box or to the proper relation with the scale 12. The burner stands normally between a pair of plumb-bobs 73, suspended from the top of the light-box and adjustable therealong, marked studs 74 being fixed in the floor of the box for determining with precision the positions of the plumb-bobs. Each of the latter hangs from a screw 75, Fig. 10, threaded at its upper end and attached at its lower end to the plumb-line, a slot or hole 76 being provided in the top 77 of the box, through which the top of the screw projects, washers 78 and 79 being provided upon the screw above and below said hole 76 and a securing-nut 80 upon the top of said screw serving to clamp said washers upon the box at all adjustments of the plumb-line, the lower washer being supported by a head or shoulder 81 upon the screw. From the burner depends a plumb-bob 82, which is useful in determining with precision the position to be occupied by the burner, particularly when an Argand burner is used, since the plumb-bob 82 may be readily lined up with the bobs 73.

A gas-meter 83, provided with water-intake 84 and thermometers 85, is connected by piping directly to the pillar 72. The piping extends horizontally at 86 from the upper portion of the meter to a standard 87, about halfway between the meter and the pillar 72, the standard resting upon the table 1 and having a telescopic top 88, provided with an eye 89, surrounding the piping 86. When the parts are set up, the height of the standard may thus be adjusted and secured by a screw 90, Fig. 2, whereby danger of leakage in any of the pipe-joints, owing to strains, is avoided, and hence there is no liability of errors from this source. Adjoining said standard double dry-governors 91 are connected in the piping, whereby a uniform pressure of gas in the testing-burner 6 is secured during the test. Near said standard 87 the piping is carried downwardly at 92 and then horizontally at 93 beneath the floor of the light-box 2 to the base of the standard or pillar 72, the portion 93 of the piping carrying a pressure-gage $94^a$. The piping is detachably connected at 95 to the meter and at 96, Fig. 8, to the pillar and lies above the table 1, so that the parts may be conveniently shipped in a connected condition, except for simply attaching the ends of the piping and adjusting the standard 87, the ends of the gallery 4 being also readily attachable to the light-boxes, so that the parts may be packed, shipped, set up, taken down, and repacked all with great facility and without danger of damage. The light-boxes stand upon short legs 97, and hence are elevated above the table, making it convenient to carry the piping 93 below the box 2 to the base of the pillar 72, while air for the burners may readily enter through perforations 94 in the bottoms of the boxes. From the bottom of the portion 92 of the piping extends a petcock 98 for drawing off water that may accumulate in the piping. The legs 99 of the meter are adjustable for leveling the same.

In operation the panels are first adjusted in the gallery so that the sighting-box may occupy about the position corresponding to the candle-power of the light to be tested. The meter is put in running order, and the burner 6 is lighted. By means of a micrometer-cock 100 the consumption of gas is adjusted to the proper rate. The candles 7 are lighted and the candle-balance manipulated in the usual manner. The doors 17 and 18 are closed and the sighting-box moved to and fro until the light shines with equal power upon the opposite sides of the disk, when a reading is taken by means of the scale and index. The usual number of readings may be taken, some with the disk reversed, and by the usual calculations the candle-power of the tested light is ascertained.

The candle-balance, which fits in a seat or socket 101 in the floor of the light-box 3, may be removed, if desired, and the test made by means of a gas-burning standard lamp 102, the form of lamp illustrated being the well-known "Edgerton screen." This is carried upon a swing-arm 103, mounted upon a vertical pillar 104 and connected by piping 105 to an inlet 106 of the gas-meter, the gas which supplies the standard lamp not passing through the meter. Said piping resembles that already described, being detachably connected at its ends for the purposes mentioned and adjustably supported between its ends upon an extensible standard 107 and including double dry governors 108 and petcock 109. The standard lamp carries a plumb-bob 110 to range between a pair of plumb-bobs 111, each of the latter being adjustable and overhanging marked studs 112 in the box-floor, said studs occupying an exact relation to the studs 74 in the other box and to the scale 12. The swing-arm pillar enables the standard lamp to be adjusted with precision and also to be swung out of the way when the candle-balance is in use, as at Fig. 1.

When it is desired to test or measure the standard lamp 102, the candle-balance may be placed in a socket 113 in box 2, the burner 6 being swung back out of the way, the positions of the candles being adjusted by the aid of the plumb-bobs 73 and the standard lamp being adjusted by means of the plumb-bobs 110 111. Then by proper manipulation of the sighting-box and reference to the scale the candle-power of the standard lamp may be ascertained through the usual calculations, and thereafter the standard lamp may be used as a standard for measuring the light emitted by the burner 6, the candle-balance being removed.

Each of the light-boxes is provided with a ventilator or chimney for escape of the products of combustion, each ventilator comprising a pipe 114, Fig. 9, and a bell 115, surmounting the same and excluding the light, a set of three standards 116, supporting said bell above said pipe, each standard being attached at its lower end to the upper portion of the pipe by means of ears 117, secured upon the latter, the standards being threaded into the ears. At its upper end each standard has a shoulder 118 and a threaded projection 119, the bell having perforations in its rim 120, through which said projections extend. Cap-nuts 121 are threaded upon said projections and hold the bell down upon the shoulders, the bell being readily removable for convenience in cleaning. In each box a black velvet screen or wall 122 is placed upon the wall of the box opposite to the gallery and has the effect of absolutely preventing any reflection from said wall into the gallery, thus conducing to accuracy in testing the light. Each of the doors 17 and 18 is also provided with a colored-glass window 123 to permit the attendant to observe the lights, &c., within the boxes without opening the doors, which would disturb the lights.

Referring particularly to Fig. 11, the pivoted disk-frame 55 is carried by a rectangular frame comprising top and bottom bars 123, perforated to receive the pintles 57 and end bars 124, said frame comprising also the screen-plates 56 and forming a rigid structure, which is secured within the box by screws 125 and materially stiffens the box at its middle portion.

Variations may be resorted to within the scope of my invention, and portions of my improvements may be used without others.

Having thus described my invention, I claim—

1. A closed photometer comprising light-boxes and a gallery connecting them, in combination with a sighting-box adjustable along said gallery; said gallery being provided upon one side with movable panels overlapping one another to exclude the light, and said sighting-box being provided with a shield which extends behind the panels at the sides of the sighting-box opening in the gallery, to permit adjustment of the sighting-box along the gallery without admitting the light thereinto.

2. A closed photometer comprising light-boxes, a gallery connecting them, and a sighting-box adjustable along the gallery; said gallery being provided upon one side with panels movable to different positions for the purpose of making an opening for the sighting-box at any desired position along the gallery, and one panel overlapping another to prevent ingress of light between the panels.

3. A closed photometer comprising light-boxes, a gallery connecting them, and a sighting-box adjustable along the gallery; said gallery being provided with panels of assorted sizes and movable interchangeably to different positions for the purpose of making an opening for the sighting-box at any desired position along the gallery, and each panel having at its edge a strip or tongue to make a lap-joint or light-excluding joint with the adjoining panel.

4. A closed photometer comprising light-boxes, a gallery connecting them, and a sighting-box adjustable along the gallery; said gallery being provided with interchangeable panels of assorted sizes; and means for preventing ingress of light through the joints between the panels.

5. A closed photometer comprising light-boxes, a gallery connecting them, and a sighting-box within the gallery and adjustable through at least half the length of the gallery; means being provided for excluding completely exterior light from the gallery in all positions to which the sighting-box may be adjusted.

6. A closed photometer comprising light-boxes, a gallery connecting them, and a sighting-box within the gallery and adjustable therealong; said gallery being provided with interchangeable panels of assorted sizes, and each panel having moldings or strips upon its side edges, one strip overlapping the edge of the panel, and the other strip being set in a corresponding distance from the opposite edge of the panel, to form a recess for receiving the projecting strip of the adjoining panel.

7. A closed photometer comprising light-boxes, a gallery connecting them, and a sighting-box within the gallery and adjustable therealong; said gallery being provided with interchangeable panels, each having at one edge a projecting strip or tongue and at its opposite edge a corresponding recess.

8. A closed photometer comprising light-boxes, a gallery connecting them, and a sighting-box within the gallery and adjustable therealong; said gallery being provided with interchangeable panels of assorted sizes, each panel having moldings extending along its top, bottom and side edges, one side strip overlapping the edge of the panel and the other side strip being set in from the opposite edge of the panel for a corresponding distance.

9. A closed photometer comprising light-boxes, a gallery connecting them, and a sighting-box adjustable along the gallery; said sighting-box being provided with supporting guide-rolls and also with a plain supporting-roll, and said gallery being provided with a square track whereon said guide-rolls run, the latter having front and rear guide-flanges and fitting upon said track.

10. A closed photometer comprising light-boxes, a gallery connecting them, and a sighting-box within the gallery; said sighting-box being provided with supporting and guiding rolls, and being also provided at the front of the gallery with a relatively large screen, separate from the box and attached thereto by means of a pair of brackets at the sides of the box, each bracket consisting principally of a vertical plate which serves as a screen to prevent ingress of light laterally between the box and said front screen, and said plates being provided with stiffening-ribs.

11. A sighting-box for a photometer, having openings in its ends and a light-testing disk between said openings, and also having interior screens between said disk and said ends; said screens being provided with openings smaller than the openings in said ends; and mirrors placed between said disk and said screens.

12. A sighting-box for a photometer, formed of sheet metal, and having a light-testing disk, and screens between the disk and the ends of the box; said ends and screens having light-admitting openings, and mirrors being disposed angularly between said screens and said disk; and said screens being formed of sheet metal and serving to stiffen the box.

13. A sighting-box for a photometer, formed of sheet metal, and provided with an interior pivoted frame containing a light-testing disk; a shaft being geared at its rear end to said frame and extending to the front of the box and carrying a hand-wheel or lever; the bottom of said box being provided with a pair of pendent stiffening-ribs united by a cross-rib, and said shaft having a bearing in said cross-rib near its point of connection to said pivoted frame.

14. A sighting-box for a photometer, formed of sheet metal, and provided with an interior pivoted frame containing a light-testing disk; a notched member being provided upon said pivoted frame, and a spring-detent being secured to the bottom of said box and engaging said notched member, to retain the frame in different positions; a horizontal shaft being connected at its rear end by bevel-gears to said pivoted frame, and extending to the front of the box and carrying a hand-wheel; the bottom of said box being provided with a pair of pendent stiffening-ribs united by a cross-rib, and said shaft having a bearing in said cross-rib near the point of engagement of said gears, and said cross-rib being also secured to the bottom of the box by braces between said shaft and said stiffening-ribs.

15. In a photometer, the combination with a gas-meter, of a swing-arm pillar connected thereto and provided with a testing-burner, means for carrying a standard light, said swing-arm pillar enabling relative adjustment between said burner and said standard light, and a sighting-box adjustable between the burner and the standard light; said sighting-box being mounted in a closed gallery, which at its ends is connected to light-boxes.

16. In a photometer, the combination of two light-boxes, a gallery connecting them, a sighting-box within and adjustable along said gallery, a swing-arm pillar in one of said light-boxes, a burner upon said pillar, a pair of plumb-bobs, means for determining with precision the positions to be occupied by said plumb-bobs, a plumb-bob suspended from said burner between said plumb-bobs, and means in the other light-box for carrying a light for comparison with the light emitted from said burner.

17. In a photometer, the combination of a swing-arm pillar, a burner thereon, a plumb-bob suspended from said burner, means for determining with precision the position to be occupied by said plumb-bob, and means for carrying a light for comparison with the light emitted from said burner; said burner and said light-carrying means being mounted in closed boxes, and a gallery connecting said boxes and being provided with a sighting-box.

18. A photometer comprising a table, light-boxes one supported upon the table and elevated thereabove, a gallery connecting said light-boxes, a sighting-box adjustable along said gallery, a meter upon said table, a testing-burner in one of said boxes, a pillar supporting said burner, piping extending from said meter above said table and beneath the box containing said pillar, said piping being connected to said pillar, and governing means connected in said piping between said meter and said pillar.

19. A photometer comprising a table, light-boxes one of which is supported upon the table and elevated thereabove, a gallery connecting said light-boxes, a sighting-box adjustable along said gallery, a gas-meter upon said table, a testing-burner in said elevated box, a pillar within said box and carrying said burner, piping extending from said meter above said table and connected to said pillar, double dry governors between said meter and said pillar and connected in said pipe, and a vertically-adjustable support upon said table for supporting said piping between said meter and said pillar.

20. A photometer comprising a table, closed light-boxes thereon, a closed gallery connecting said light-boxes, a sighting-box adjustable along said gallery, a gas-meter upon said table, a testing-burner in one of said boxes, piping extending from said gas-meter above said table to said burner, and a pressure-governor in said piping.

21. A photometer comprising a table, closed light-boxes thereon, a closed gallery connecting said light-boxes, a sighting-box adjustable along said gallery, a gas-meter upon said table, a testing-burner in one of said boxes, piping above said table extending from said gas-meter to said burner and detachably connected to both, and a pressure-gage and double dry governors connected in said piping and supported thereon.

22. A photometer comprising a table, light-boxes thereon, a gallery connecting said light-boxes, a sighting-box adjustable along said gallery, a gas-meter upon said table, a pillar in one of said boxes, a burner carried by said pillar, piping extending above said table from said gas-meter to said pillar and detachably connected to both, a vertically-adjustable support for said piping between said pillar and said gas-meter, said piping extending from the upper portion of said meter about horizontally to said support, and then downwardly and to the base of said pillar, and being provided at its lower portion with a petcock, and double dry governors connected in said piping adjacent to said support.

23. A photometer comprising a table, closed light-boxes, a closed gallery connecting said light-boxes, a sighting-box adjustable along said gallery, a gas-meter upon said table, a pillar in one of said boxes, a burner carried by said pillar, piping extending from said gas-meter to said pillar and detachably connected to both, means supporting said piping above said table, and the following devices included in said piping, viz., a pressure-governor, a pressure-gage, and a petcock.

24. A photometer comprising a table, closed light-boxes, a closed gallery connecting said light-boxes, a sighting-box adjustable along said gallery, a gas-meter upon said table, a burner in one of said boxes, piping extending above said table from said gas-meter to said burner and detachably connected to both, an extensible standard supporting said piping between said burner and said gas-meter, and a pressure-governor and pressure-gage connected in said piping and supported thereon.

25. A photometer comprising a table, closed light-boxes, a closed gallery connecting said light-boxes, a sighting-box adjustable along said gallery, a gas-meter, a burner-carrying arm mounted in one of said boxes and connected to said gas-meter, means for determining with precision the position to which said arm is to be swung, and means in the other of said light-boxes for carrying a burner or light for comparison.

26. A photometer comprising a table, a closed light-box supported upon and elevated above the table, a gas-meter upon said table, a pillar in said box, a burner carried by said pillar, a vertically-adjustable standard between said box and said meter, piping detachably connected to said meter and supported upon said standard and extending downwardly therefrom and beneath said box and detachably connected to the base of said standard, and a pressure-governor and pressure-gage mounted upon said piping.

27. A traveling sight-box for a photometer, consisting of thin sheet metal, and provided with supporting-rolls; each roll being carried upon a bracket, and each bracket comprising a depending plate or lug to carry the roll, an integral horizontal plate of relatively large area secured upon the bottom of the box, and a stiffening-web connecting said plates.

28. A traveling sight-box for a photometer, consisting of thin sheet metal, a shield carrying a sighting-hood, and plates attaching said shield to said box; said plates standing vertically at the side portions of the box to form screens, and each plate being formed with a flange along one edge for attachment to the box, and with a reverse flange along the opposite edge for attachment to the shield, and stiffening-webs between the plates and flanges.

29. In a photometer, the combination with two light-boxes, a connecting closed gallery, and a sighting-box movable along said gallery, of a wooden bar, a celluloid scale secured upon and directly to the face of said bar, screws attaching said bar to said gallery, and an index upon said sighting-box.

30. A ventilator for a light-box of a photometer, comprising a pipe and a bell surmounting the same; a set of standards supporting said bell above said pipe, each standard being attached at its lower end to the upper portion of the pipe, and at its upper end having a shoulder and a threaded projection, and said bell having perforations through which said projections extend; and cap-nuts threaded upon said projections and holding said bell down upon said shoulders.

31. In a photometer comprising two light-boxes, a connecting-gallery and a sighting-box adjustable along the gallery, the combination with a burner or light-carrying device in each of the boxes, of studs in the floor of each box, plumb-bobs suspended from the tops of the boxes over said studs, and means for adjusting the plumb-bobs; said studs being provided with marks to indicate the correct positions for the plumb-bobs.

32. In a photometer, a light-box, a burner therein, means upon one side of the burner for measuring the light, and a black-velvet wall or screen upon the other side of the burner.

33. In a photometer, the combination with two light-boxes, an intervening gallery, and a sighting-box, of burners or light-carriers in the light-boxes, and black-velvet walls or screens in said light-boxes opposite the ends of said gallery.

34. In a photometer, the combination with two light-boxes of a connecting closed gallery and a sighting-box adjustable along said gallery; each of said light-boxes being provided with a door, and each door being provided with a window of colored glass.

35. A closed photometer comprising two light-boxes, an intervening closed gallery and sighting-box, a testing-burner in one of said light-boxes, and a gas-burning standard-lamp in the other of said boxes.

36. A closed photometer comprising two light-boxes, an intervening closed gallery and sighting-box, a testing-burner in one of said light-boxes, a gas-burning standard-lamp in the other of said boxes, both said burner and said lamp being movable out of working position, a candle-balance, and a seat or fixture in each light-box and accurately fitted to said candle-balance, the latter being removable from either seat or fixture to the other at will.

37. A closed photometer comprising two closed light-boxes, an intervening closed gallery and sighting-box, a testing-burner confined within one of said light-boxes, a gas-burning standard-lamp confined within the other of said boxes, and means for measuring the light emitted by said standard-lamp.

38. A closed photometer comprising two closed light-boxes, an intervening closed gallery and sighting-box, a testing-burner confined within one of said light-boxes, a gas-burning standard-lamp confined within the other of said boxes, and means for comparing the light emitted by said testing-burner with either the light of said lamp or with the light of a candle, at will.

39. A closed photometer comprising two closed light-boxes, an intervening closed gallery and sighting-box, a testing-burner confined within one of said light-boxes, a gas-burning standard-lamp confined within the other of said boxes, means for measuring the light emitted by said standard-lamp, and means for testing said testing-burner by either said standard-lamp or a candle, at will.

40. A closed photometer comprising two closed light-boxes, an intervening closed gallery and sighting-box, a testing-burner confined within one of said light-boxes, a gas-burning standard-lamp movable into and out of working position confined within the other of said boxes, and a candle-balance fitted in the last-mentioned box but movable to a position of disuse.

41. A closed photometer comprising two closed light-boxes, an intervening closed gallery and sighting-box, a gas-burning standard-lamp in one of said boxes, a candle-balance, a seat or fixture confined within said box to which said candle-balance is removably fitted, and a testing-burner confined within the other of said boxes.

42. A closed photometer comprising two closed light-boxes, an intervening closed gallery and sighting-box, a testing-burner confined within one of said boxes, a seat or fixture confined within said box, a candle-balance removably fitted to said seat or fixture, and a gas-burning standard-lamp in the other of said boxes.

43. A closed photometer comprising two light-boxes, a gallery connecting them, a sighting-box adjustable along said gallery; means being provided for excluding exterior light from said gallery while permitting ample adjustment of the sighting-box therein; a testing-burner in one of said light-boxes, and a gas-burning standard-lamp in the other of said boxes.

44. A closed photometer comprising two light-boxes, a closed gallery connecting them, said gallery having interchangeable panels of assorted widths, whereby an opening may be formed where desired in the gallery, means being provided for excluding light from between said panels, a sighting-box within said gallery and adjustable therealong and having a light-shield extending behind the panels, a testing-burner in one of said light-boxes, and a gas-burning standard-lamp in the other of said boxes.

45. A closed photometer comprising light-boxes, a gallery connecting them, a sighting-box within the gallery and having an ample range of adjustment therealong; means being provided for excluding completely exterior light from the gallery in all positions to which the sighting-box may be adjusted; a testing-burner in one of said light-boxes, and a gas-burning standard-lamp in the other of said boxes.

46. In a photometer, the combination with two closed light-boxes, a closed gallery connecting them, and a sighting-box adjustable along said gallery, of a testing-burner confined within one of said light-boxes, a gas-burning standard-lamp confined within the other of said boxes, and means for permitting relative to-and-fro adjustment between said burner and said lamp.

47. A photometer comprising two closed light-boxes, a connecting closed gallery, a sighting-box adjustable along said gallery, a testing-burner confined within one of said light-boxes, a gas-burning standard-lamp confined within the other of said boxes, means for permitting relative to-and-fro adjustment between said burner and said lamp, and means for determining with precision the relative positions to be occupied by said burner and lamp.

48. In a photometer comprising two light-boxes, a connecting-gallery, and a sighting-box adjustable along said gallery, the combination of a testing-burner in one of said light-boxes, a gas-burning standard-lamp in the other of said boxes, a swing-arm pillar whereon is mounted one of said burner and lamp elements, and means for determining with precision the relative positions to be occupied by said burner and lamp.

49. In a photometer comprising two light-boxes, a connecting-gallery, and a sighting-box adjustable along said gallery, the combination of a testing-burner in one of said light-boxes, a swing-arm whereon it is mounted, a gas-meter connected to said swing-arm, a gas-burning standard-lamp in the other of said boxes, and a swing-arm whereon said lamp is mounted.

50. In a photometer comprising two light-boxes, a connecting-gallery, and a sighting-box adjustable along said gallery, the combination of a testing-burner in one of said light-boxes, a swing-arm pillar whereon it is mounted, a gas-meter connected to said swing-arm pillar, a gas-burning standard-lamp in the other of said boxes, a swing-arm pillar whereon said lamp is mounted, and means in the boxes for determining with precision the positions to be occupied by the burner and lamp.

51. In a photometer comprising two light-boxes, a connecting-gallery, and a sighting-box adjustable along said gallery, the combination of a testing-burner in one of said light-boxes, a gas-burning standard-lamp in the other of said boxes, a swing-arm whereon said lamp is mounted, a pair of plumb-bobs, means for determining with precision the positions to be occupied by said plumb-bobs, and a plumb-bob suspended from said lamp between said plumb-bobs.

52. In a photometer comprising two light-boxes, a connecting-gallery, and a sighting-box adjustable along said gallery, the combination of a testing-burner in one of said light-boxes, a gas-burning standard-lamp in the other of said boxes, a swing-arm pillar whereon said lamp is mounted, a plumb-bob suspended from said lamp, and means for determining with precision the position to be occupied by said plumb-bob.

53. A photometer comprising a table, light-boxes thereon, a gallery connecting said light-boxes, a sighting-box adjustable along said gallery, a meter upon said table, a testing-burner in one of said boxes, a gas-burning standard-lamp in the other of said boxes, a gas-inlet connected to said meter, piping extending from said inlet to said lamp, a pressure-governor in said piping, piping extending from said gas-meter to said testing-burner, and a pressure-governor in the latter piping.

54. A photometer comprising a table, light-boxes thereon, a gallery connecting said light-boxes, a sighting-box adjustable along said gallery, a meter upon said table, a testing-burner in one of said boxes, a swing-arm pillar whereon said burner is mounted, a gas-burning standard-lamp in the other of said boxes, a swing-arm pillar whereon said standard-lamp is mounted, a gas-inlet connected to said meter, piping extending above said table from said inlet to the pillar of said lamp, double dry governors included in said piping, piping extending from said meter to the other of said pillars and including double dry governors, and vertically-adjustable supports upon said table for said pipings.

WALTER HINMAN.

Witnesses:
B. C. STICKNEY,
WM. N. MACLEAN.